United States Patent [19]

Stanford

[11] Patent Number: 4,673,415
[45] Date of Patent: Jun. 16, 1987

[54] OXYGEN PRODUCTION SYSTEM WITH TWO STAGE OXYGEN PRESSURIZATION

[75] Inventor: Raymond A. Stanford, Rock Island, Ill.

[73] Assignee: VBM Corporation, Louisville, Ky.

[21] Appl. No.: 865,869

[22] Filed: May 22, 1986

[51] Int. Cl.⁴ .............................................. B01D 53/04
[52] U.S. Cl. ......................................... 55/21; 55/68; 55/179; 55/218; 55/389; 417/392; 417/394
[58] Field of Search ................... 55/21, 33, 58, 62, 68, 55/75, 179, 210, 218, 389, 417, 420; 92/34, 86.5; 417/392, 394

[56] References Cited

U.S. PATENT DOCUMENTS

| | | | |
|---|---|---|---|
| 314,218 | 3/1885 | Bolton | 92/86.5 |
| 1,771,424 | 7/1930 | Steurs | 417/394 |
| 2,772,543 | 12/1956 | Berry | 417/394 X |
| 3,048,114 | 8/1962 | Browne | 417/394 |
| 3,198,171 | 8/1965 | Westphal | 417/394 X |
| 3,310,942 | 3/1967 | Stanford | 417/392 X |
| 3,490,205 | 1/1970 | Hauser | 55/417 X |
| 3,524,714 | 8/1970 | Grove et al. | 417/394 X |
| 3,625,006 | 12/1971 | Schoenleben | 417/392 |
| 4,039,306 | 8/1977 | Taylor | 55/179 X |
| 4,229,143 | 10/1980 | Pucher et al. | 417/392 X |
| 4,349,357 | 9/1982 | Russell | 55/21 |
| 4,383,804 | 5/1983 | Budzich | 55/218 X |
| 4,515,516 | 5/1985 | Perrine et al. | 417/392 X |
| 4,531,951 | 7/1985 | Burt et al. | 55/179 X |
| 4,552,571 | 11/1985 | Dechene | 55/21 |

Primary Examiner—Robert Spitzer
Attorney, Agent, or Firm—Fay, Sharpe, Beall, Fagan, Minnich & McKee

[57] ABSTRACT

A compressor (10) and an accumulator tank (12) supply compressed air to an oxygen concentrator (32). Separated oxygen flows through a first check valve (40) into a first oxygen receiving region (54) of a first tank (50) displacing a first movable barrier (52). When a pressure sensor (72) senses that the pressure in the first oxygen receiving region has reached a preselected level, it causes a valve (62) to move from a vent state to a state in which compressed air is supplied from the accumulator into a pressurizing fluid receiving region (56). This displaces the first movable barrier with a first preselected pressure, pumping the oxygen through a second check valve (80) into a second oxygen receiving region (94) of a second tank (90). A second movable barrier (92) separates the second oxygen receiving region from a second pressurizing fluid receiving region (96). A pressure regulator (98) supplies compressed air from the accumulator into the second pressurizing fluid receiving region (96) at a second preselected pressure, which is lower than the first preselected pressure. In this manner, the separated oxygen in the second tank is continuously pressurized to the second preselected pressure.

15 Claims, 2 Drawing Figures

OXYGEN PRODUCTION SYSTEM WITH TWO STAGE OXYGEN PRESSURIZATION

BACKGROUND OF THE INVENTION

The present invention relates to the art of gas separation. It finds particular application in the separation of oxygen from atmospheric air for welding or other downstream equipment at relatively high pressures. It is to be appreciated that the invention is applicable to selective adsorption separation, membrane separation, hydrolysis, peroxide reduction, and other techniques for separating a selected gaseous component from gaseous mixtures, fluids, chemical compositions, or the like.

Heretofore, oxygen has commonly been supplied to automotive garages and other industrial applications in pressurized cylinders, commonly pressurized on the order of 2200 psi. To overcome the inconvenience and expense associated with the delivery of bottled oxygen and the maintenance of an oxygen cylinder inventory, oxygen separators which separate oxygen from atmospheric air have been used to supply oxygen for welding and other industrial equipment.

These oxygen separators commonly included a compressor for supplying atmospheric air at a superatmospheric pressure. A crossover valve alternately channeled the atmospheric air to one of a pair of beds filled with a physical separation medium. As one of the beds passed the oxygen component and retained nitrogen, carbon dioxide, and other components of atmospheric air, a fraction of the separated oxygen was fed back to the other bed flushing the retained components. The pressurized atmospheric air was alternately supplied to each bed as the other was flushed and rejuvenated to maintain a continuing supply of oxygen or oxygen-rich gas. One of the primary costs associated with oxygen separators was the cost of the physical separation medium.

Not only did the physical separation medium beds render the cost of oxygen separators relatively expensive, but the oxygen was supplied at a relatively low pressure, e.g. below 60 psi. These low oxygen pressures tended to create a lazy welding flame with little momentum. Such low momentum flames were only adequate for cutting and welding lighter gauges of steel and were inadequate for heavier steel plates and castings.

Another drawback to oxygen separators is that they separated oxygen from atmospheric air relatively slowly. To increase the oxygen production rate, more of the expensive physical separation medium was required. Alternately, a reservoir maintained a supply of the separated oxygen rich gas. The oxygen reservoir accomodated peak demand periods without increasing the size of the physical separation medium beds.

In accordance with the present invention, a new and improved gas separation system with a high pressure separated gas reservoir is provided which overcomes the above referenced problems and others.

SUMMARY OF THE INVENTION

In accordance with a first aspect of the present invention, an apparatus is provided for providing a selected gaseous component at a high pressure. A separating means separates and supplies a selected gaseous component at a relatively low separated gas pressure. In the preferred embodiment, the separating means physically separates oxygen from atmospheric air, although other oxygen and gas separation techniques are also contemplated. A first one-way valve means permits the separated gaseous component to flow from the separating means to a first pressurizing means and inhibits the flow from the first pressurizing means back to the separating means. The first pressurizing means cyclically receives the selected gaseous component at the relatively low separated gas pressure and increases the pressure of the received gaseous component to a first preselected pressure. A second one-way valve means permits the gaseous component pressurized to the first preselected pressure to flow from the first pressurizing means to a second pressurizing means and blocks the flow from the second pressurizing means back to the first pressurizing means. The second pressurizing means continuously pressurizes the received gaseous component to a second preselected pressure. The second preselected pressure is less than the first preselected pressure.

In accordance with another aspect of the present invention, a method of supplying a selected gaseous component is provided. The selected gaseous component is separated from a source of the gaseous component, such as a mixture thereof. The separated gaseous component is at a relatively low separated gas pressure. In a first tank, the separated gas is cyclically received at the relatively low separated gas pressure and pressurized to a first preselected pressure. The gaseous component at the first preselected pressure is transferred to a second tank. In the second tank, the gaseous component is continuously pressurized to a second preselected pressure, which second preselected pressure is lower than the first preselected pressure. The gaseous component is selectively supplied or discharged from the second tank at the second preselected pressure to downstream equipment.

One advantage of the present invention is that it supplies oxygen to downstream equipment at relatively high pressures.

Another advantage of the present invention is that it optimizes efficiency of the oxygen separator by maintaining a relatively low pressure at the outlet of the oxygen separator.

Yet another advantage of the present invention is that it facilitates the use of single, physical separation medium bed oxygen concentrators.

Yet other advantages of the present invention will become apparent to those of ordinary skill in the art upon reading and understanding the following detailed description of the preferred embodiments.

BRIEF DESCRIPTION OF THE DRAWINGS

The invention may take form in various parts and arrangements of parts or in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
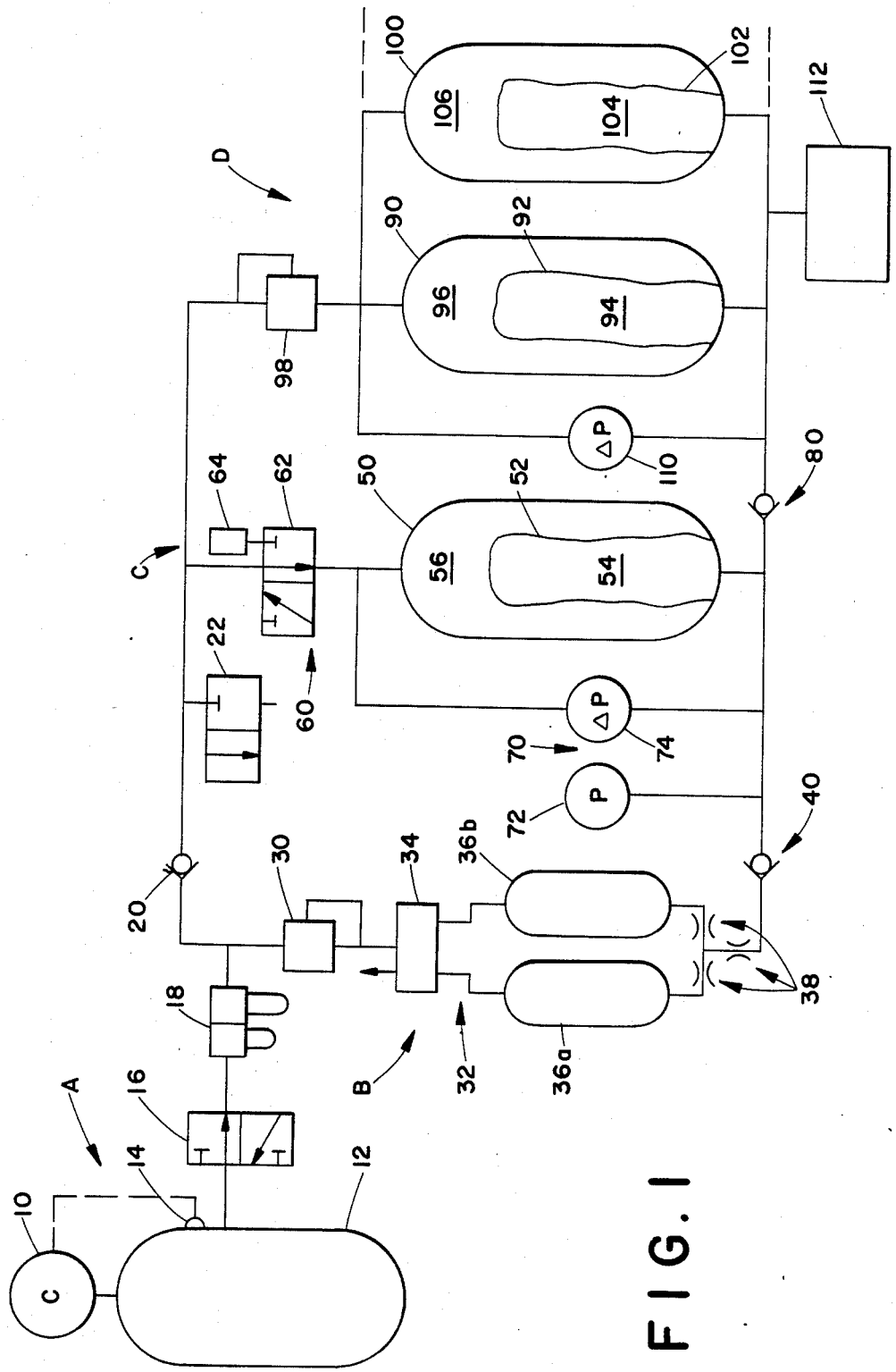
FIG. 1 is a diagrammatic illustration of an apparatus for separating and supplying a preselected gaseous component in accordance with the present invention; and, FIG. 2 is an alternate embodiment of the gas separation and supply system of FIG. 1.

With reference to FIG. 1, a source A provides a supply of a composition containing the gaseous component to be separated. A separating means B separates the preselected gaseous component from the composition from the source. In the preferred embodiment, the source is a compressor which supplies compressed atmospheric air and the separation means B separates the oxygen component therefrom. Optionally, nitrogen or other gases may be selectively separated. The separating means may include a single or multiple beds of a physical separation medium for selectively passing oxygen downsteam and retaining other components. As other options, the separating means may include a membrane for selectively passing oxygen or other gases, a means for liberating oxygen from a peroxide solution, a chemical reaction chamber for carrying out chemical reactions in which the selected gaseous component is released, a hydrolysis means for electrically separating oxygen from water, or the like.

A first or cyclic pressurizing means C cyclically receives the separated oxygen or other gaseous component from the separator B and increases the pressure of the received gaseous component to a first preselected pressure. In the preferred embodiment, the cyclic pressurizing means is pneumatically powered with compressed air from the source A. A second or continuous pressurizing means D continuously pressurizes gas received from the first pressurizing means C to a second preselected pressure, which second preselected pressure is lower than the first preselected pressure. In the preferred embodiment, the continuous pressurizing means is biased to the second preselected pressure by compressed air from the source A.

The source A includes a compressor 10 which supplies compressed air to the other system components. Optionally, an accumulator 12 may be connected between the compressor and the other system components. Commonly, a pressure sensor 14 is disposed in the accumulator to operate the compressor as necessary to maintain the pressure therein at a preselected supply pressure, e.g. 100 psi. The accumulator may be connected directly with downstream equipment, such as pneumatically operated equipment, to provide compressed air thereto at a substantially constant pressure.

A main compressed air supply valve 16 selectively supplies compressed air to the downstream system components. A filter and other conditioning means 18 selectively removes oil, water vapor, and other contaminants from the compressed air. In the event of a system malfunction, a check valve 20 prevents the possible backflow of oxygen rich gas from leaking pressurizing means into the oil contaminated portions of the system upstream from the filter and conditioning means 18. The combination of oil tracks and oxygen rich gas could result in spontaneous combustion. A drain valve 22 enables the system to be selectively vented to atmospheric pressure.

The separating means B includes a pressure regulator 30 and a conventional oxygen concentrator 32. In a conventional two bed oxygen concentrator, for example, a crossover valve 34 selectively connects the received pressurized air with one of a pair of molecular sieve beds 36a, 36b. The crossover valve connects the other of the molecular sieve beds with a nitrogen or waste gas vent. The molecular sieve beds are filled with a physical separation medium, such as a zeolite, which permits oxygen to pass therethrough while absorbing nitrogen, carbon dioxide, and other more strongly adsorbed molecules. A restrictor system 38 or flow control valve system permits a fraction of the separated oxygen to be fed back into the physical separation bed which is interconnected with the nitrogen vent. The fed back oxygen backwashes or flushes the nitrogen, carbon dioxide, and other absorbed molecules from the bed rejuvenating it. The remainder of the oxygen, or the primary product gas, passes downstream. The crossover control valve cyclically reverses the beds such that one of the beds is providing oxygen as the other is being rejuvenated. Optionally, a single bed may alternately separate oxygen and be rejuvenated. As yet another option, three or more beds may be provided to provide a more continuous flow of oxygen.

A first one-way valve means 40 permits the flow of gas from the separator B to the first pressurizing means C and blocks the flow of gas from the first pressurizing means C back to the separating means B. In the preferred embodiment, the first one-way valve means is a check valve which enables oxygen to flow from the separator into the first pressurizing means whenever the pressure on the separator side of the check valve is higher than the pressure on the first pressurizing means side of the check valve. Optionally, other one-way valve means may be utilized. For example, an on/off valve may be provided which is operated under the control of a central control that monitors the cycles of the first pressurizing means and the oxygen concentrator 32. The central control opens the valve at times in which the oxygen is to flow from the separator to the first pressurizing means and closes the valve other times.

The first pressurizing means C includes a first tank or reservoir 50. A first movable barrier 52, such as a bladder or piston, divides the tank into a first oxygen receiving region 54 and a first pressurizing fluid receiving region 56. The relative size of the first oxygen and pressurizing fluid regions varies in accordance with the relative pressure of gases therein.

A pressurizing fluid supply means 60 cyclically supplies pressurizing fluid to the first pressurizing fluid receiving region 56 and vents the first pressurizing fluid receiving region. However, it may be vented to any pressure lower than the separated gas or oxygen pressure at the outlet of the oxygen concentrator 32 including subatmospheric pressures. In the preferred embodiment, the pressurizing fluid receiving region is vented to atmosphere. The pressurizing fluid supply means includes a cyclically operated valve 62 which alternately connects the first pressurizing fluid region 56 with the air compressor 10 and with a muffler 64.

A barrier displacement sensing means 70 senses displacement of the first movable barrier between extremes of movement, i.e. between a maximum oxygen region volume and a minimum oxygen region volume. In the preferred embodiment, the barrier displacement sensing means includes a high pressure monitor means 72 which monitors the pressure of the first pressurizing means adjacent the one-way valve means 40. The high pressure monitoring means 72 enables the oxygen concentrator 32 to separate oxygen from atmospheric air when the sensed pressure is below a preselected point of inefficiency of the concentrator. When the pressure is higher than the preselected inefficiency point, the high pressure monitor disables the concentrator 32 and causes the cyclic pressurizing valve 62 to start pressurizing the first pressurizing fluid receiving region. The barrier displacement sensing means 70 further includes a first differential pressure sensor 74 which senses the pressure difference between the first pressurizing fluid receiving region 56 and the first oxygen receiving region 54. More specifically, as the pressurizing fluid enters the first pressurizing fluid receiving region, the first movable barrier 52 is displaced, compressing the oxygen in the first oxygen receiving region.

The compressed oxygen moves through a second one-way valve means or check valve 80 into the second pressurizing means D which is continuously biased to the second, lower preselected pressure. When the first movable barrier reaches an extreme position which minimizes the oxygen receiving region, i.e. bottoms out, the pressure differential increases. More specifically, the pressure in the first oxygen receiving region and connecting tubing decreases to the pressure in the second pressurizing means D and the pressure in the first pressurizing fluid receiving region increases fully to the first preselected pressure. This increase in the pressure differential is sensed by the pressure differential sensing means 74 which responds by causing the cyclic pressurizing valve 62 to change states back to the vent state.

The second one-way valve means 80 allows oxygen or another selected gaseous component to flow from the first pressurizing means C to the second pressurizing means D. Conversely, the one-way valve means 80 prevents gas from flowing from the second pressurizing means D back to the first pressurizing means C. In the preferred embodiment, the second one-way valve means is spring biased check valve. Optionally, other one-way valve means, such as a valve under the control of the barrier displacement sensing means 70, may be provided.

The second pressurizing means D includes a second tank or reservoir 90 with a second movable barrier 92 mounted therein. The second movable barrier separates the second tank into a second oxygen or separated gaseous component receiving region 94 and a second pressurizing fluid receiving region 96. A pressure differential creating means 98 reduces the pressure from the accumulator 12 to the second preselected pressure. In the preferred embodiment, the pressure differential creating means is a biasing air relay or a different pressure regulator which causes the second preselected pressure to vary from the accumulator pressure by a preselected pressure differential. Optionally, a pressure regulator may hold the second preselected pressure to a fixed pressure. For example, the pressure reducing means may reduce a 100 psi compressor pressure by 10 psi to 90 psi. The pressure differential creating means continuously supplies pressurizing fluid with the second preselected pressure into the second pressurizing fluid receiving region 96. This continuously biases and pressurizes the oxygen in the second oxygen receiving region 94 to the second preselected pressure. Optionally, additional tanks such as tank 100 having a movable barrier 102 which divides an oxygen receiving region 104 from a pressurizing fluid receiving region 106, may be connected in parallel with the second tank 90. In this manner, the oxygen storage capacity may be increased.

A second differential pressure sensing means 110 senses the pressure differential between the second pressurizing means oxygen receiving regions 94, 104 and the second pressurizing fluid receiving regions 96, 106. When the second differential pressure sensing means 110 senses that the pressure in the second oxygen receiving region has dropped significantly below the second preselected pressure, it is an indication that the oxygen supply has been depleted by downstream equipment 112. An appropriate low pressure or low oxygen supply warning alarm is activated. Conversely, when the second movable barriers 92, 102 are at the extreme in which the oxygen receiving regions are at their maximum, the pressure in the oxygen receiving region will increase toward the first preselected pressure. Upon sensing this pressure differential, the separator 32 is disabled either by the second differential pressure sensing means 110 or by the high pressure sensing means 72. When the second pressurizing means oxygen reservoirs are pressurized to the first preselected pressure, the first pressurizing means will be unable to move the first movable barrier 52 fully to the extreme at which the first oxygen reservoir 54 is minimized. This will maintain the pressure in the first oxygen receiving region and the interconnecting tubing the same at the first preselected pressure which is above the preselected inefficiency pressure of a monitor 72.

In operation, the drain valve 22 and the main supply valve 16 are turned to the run condition. The pressure regulator valve 30 prevents the concentrator B from being overpressurized. The concentrator commences cycling to provide oxygen at the relatively low oxygen or separated gas pressure through the first check valve 40 into the first oxygen receiving region 54 of the first tank 50. The first pressurizing fluid receiving reservoir 56 is connected by the cyclically operated valve 62 to the muffler 64. The air or other pressurizing fluid is vented to the atmosphere as the first oxygen receiving region 54 fills with oxygen.

When the pressure in the first oxygen receiving region has risen to the preselected point of separator inefficiency, the high pressure sensing means 72 turns off the concentrator 32 and cycles the valve 62 to a pumping state. Air from the accumulator 12 is supplied at the first preselected pressure to the first pressurizing fluid receiving region 56. This increases the pressure of the oxygen in the first oxygen receiving region causing the pressure sensing means 72 to disable the concentrator 32 during the pumping stage of the cycle. The first check valve 40 prevents the loss of oxygen through the concentrator and the second check valve 80 permits the oxygen pressurized generally to the first pressure to be pumped to the second pressurizing means D.

The pressure regulator 98 holds the pressure in the second pressurizing fluid receiving region 96 to a pressure lower than the first pressure. The oxygen is pumped from the first oxygen receiving region 54 into the second oxygen receiving region 94 displacing the second movable barrier 92. When the first movable barrier 52 bottoms out, the differential pressure sensing means 74 senses that the movable barrier has reached the extreme at which the oxygen receiving region is at a minimum. The pressure differential sensing means switches the cyclically operated valve 62 to its exhaust state. The compressed air escapes from the pressurizing fluid receiving region 56 to the atmosphere and the pressure in the first oxygen receiving region 54 also returns to atmospheric pressure. As the pressure falls below the set point of the pressure sensing means 72, the concentrator 32 is again actuated starting another cycle. Preferably, a latching means holds the cyclically operated valve 62 in the exhaust state until the pressure sensing means 72 senses a pressure greater than the set point pressure. When the oxygen in the first oxygen receiving region 54 has again reached the set point pressure of the pressure sensing means 72, the cyclically operated valve 62 changes to the pumping state and the cycle commences again.

The system cycles as described until the storage tanks 90, 100 are full. When the second oxygen receiving regions 94, 104 are completely filled, the second movable barriers 92, 102 are fully displaced. This enables the pressure of the oxygen to rise above the second preselected pressure set by the regulator 98. When the pressure of the second oxygen receiving regions 94, 104 reaches the first preselected pressure, the first movable barrier 52 is not likely to bottom out. This maintains the oxygen in the first oxygen receiving region 54 generally at the first preselected pressure preventing the differential pressure sensing means 74 from changing the state of cyclically operated valve 62. This pressure, being above the set point of pressure sensing means 72, also prevents the oxygen concentrator 32 from running. Thus, the system remains in an idle mode until sufficient oxygen is used to drop the oxygen pressure and initiate another cycle.

Figure 2:
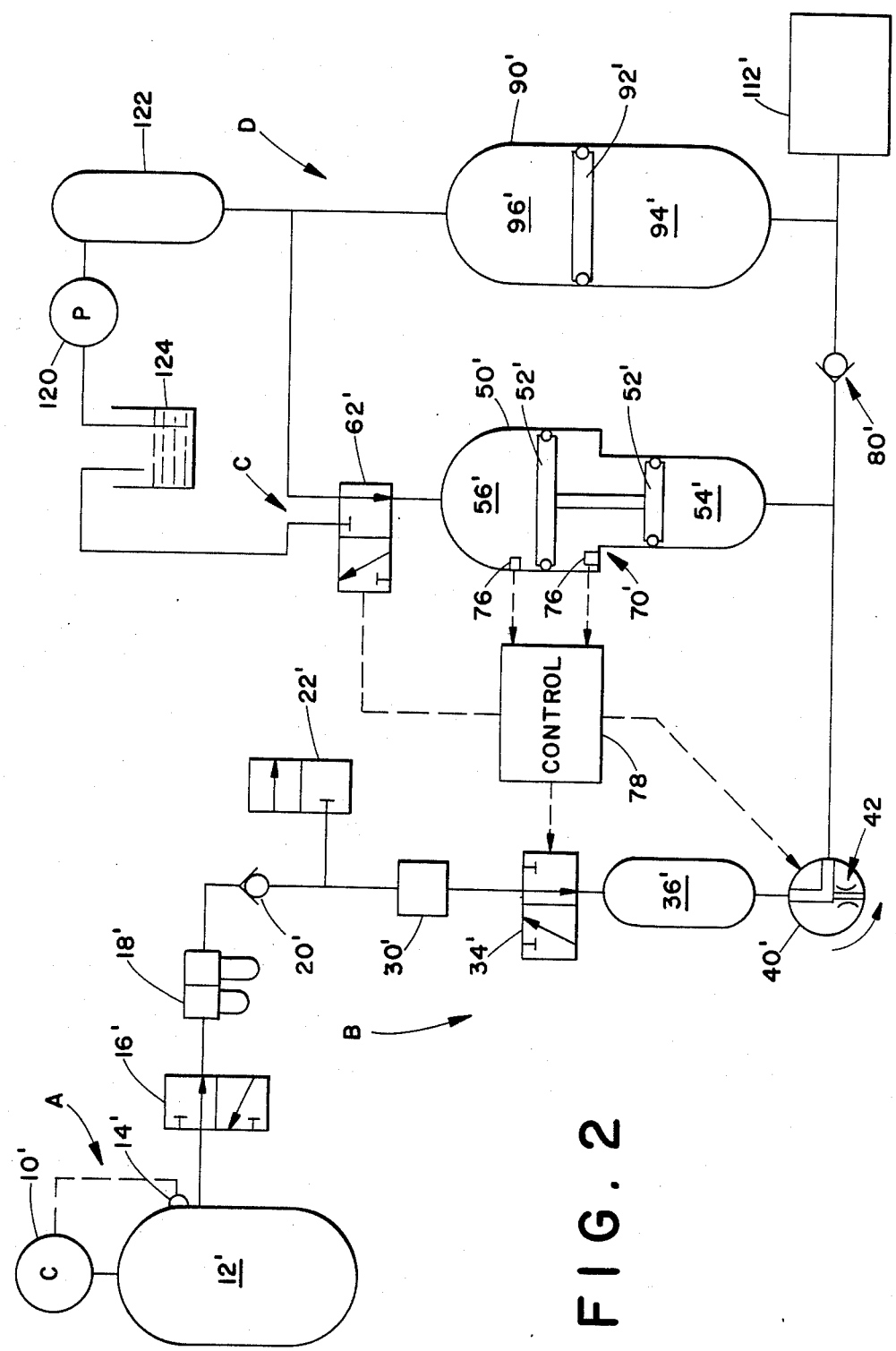

In FIG. 2, like elements with the embodiment of FIG. 1 are denoted with the same reference numeral but followed by a prime ('). A crossover valve 34' alternately connects a single bed 36' of a physical separation medium with an exhaust port and with a low pressure air compressor 10' via a pressure regulator 30'. In this manner, in one state, compressed air is fed through the single bed with oxygen passing therethrough while nitrogen and other components are trapped. In the second state, the trapped components from the previous cycle are evacuated to ready the bed for the next oxygen producing cycle. An oxygen feed back means 42 such as a restricted by-pass through or around a first valve 40' permits a small amount of oxygen from the first pressurizing means C to be fed back to the bed 36' flushing it.

The first pressurizing means C includes a first tank 50' which is divided by a first movable barrier 52' into an oxygen receiving region 54' and a first pressurizing fluid receiving region 56'. A first movable barrier displacement sensing means 70', such as limit switches 76, senses whether the first movable barrier has reached either extreme of movement. In the illustrated embodiment, the first movable barrier includes pistons of two different sizes such that the oxygen in the first oxygen receiving region is compressed to a higher pressure than the received pressurizing fluid.

The barrier displacement sensing means includes a control means 78 which causes a cyclically operated valve 62', the crossover valve 34', and the valve 40' to change states each time the first movable barrier moves to one extreme. That is, when the movable barrier reaches the maximum oxygen receiving region volume, the crossover valve 34' is connected with the atmosphere. The first valve 40' allows only a small fraction of oxygen to flow to the separating bed 36' through the feedback means 42 and the cyclic valve 62' is connected with the accumulator 12' to start the pumping state. When the first movable barrier has moved to the minimum oxygen extreme, the control means 78 causes the cyclic valve 62' to vent to atmospheric pressure, the first valve 40' to open, and the crossover valve 34' to be connected with the accumulator 12'. This starts the separation of oxygen and the filling of the first oxygen receiving region 54'.

Although the pressurizing fluid may again be compressed air, FIG. 2 has been particularly adapted to illustrate a liquid pressurizing fluid. A pump 120 pumps the fluid into an accumulator or pressure reservoir 122. The cyclic valve 62' receives pressurized fluid from the accumulator 122 to pressurize the first fluid receiving region 56' during the compression portion of the cycle. During the oxygen receiving portion of the cycle, the cyclic valve 62' is vented to a reservoir 124 at atmospheric pressure. The pump 120 returns the fluid from the atmospheric reservoir 124 to the accumulator 122 at the elevated pressure.

A second check valve 80' connects the first pressurizing means C with the second pressurizing means D. In the illustrated embodiment, the second pressurizing means D includes a second tank 90' which is divided by a second movable barrier or piston 92' into a second oxygen receiving region 94' and a second pressurizing fluid receiving region 96'. In this embodiment, the second pressurizing fluid receiving region 96' is connected directly with the accumulator such that the second pressurizing means D continuously pressurizes the oxygen in the second oxygen separating region 94' to the pressure of the accumulator 12'.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiments, the invention is now claimed to be:

1. An apparatus for supplying a selected gaseous component, the apparatus comprising:
    a separating means for separating the selected gaseous component from a gaseous mixture, the separating means providing the selected gaseous component at a relatively low separated gas pressure;
    a first one-way valve means for permitting the separated gaseous component to flow from the separating means to a first pressurizing means and for inhibiting the flow from the first pressurizing means to the separating means;
    the first pressurizing means cyclically receives the selected gaseous component at the relatively low separated gas pressure and increases the pressure of the received selected gaseous component with a first preselected pressure;
    a second one-way valve means for permitting the separated, pressurized gaseous component to flow from the first pressurizing means to a second pressurizing means and blocking the flow from the second pressurizing means to the first pressurizing means;
    the second pressurizing means (i) continuously pressurizes the received, selected gaseous component, (ii) to a preselected second pressure, which second preselected pressure is less than the first preselected pressure.

2. The apparatus as set forth in claim 1 wherein the first pressurizing means includes:
    a first tank having a first movable barrier disposed in a sealing relationship between a first separated gaseous component receiving region and a first pressurizing fluid receiving region;
    a pressurizing fluid supply means for alternately supplying pressurizing fluid to the first pressurizing fluid receiving region and for venting the first pressurizing fluid receiving region to a pressure lower than the separated gas pressure.

3. The apparatus as set forth in claim 2 further including a pressure sensor for sensing pressure in the first separated, preselected gaseous component receiving region, the pressure sensor being operatively connected with the separating means for disabling the separating means in response to sensing a pressure in excess of a preselected efficient operating pressure of the separating means, which preselected efficient operating pressure is less than the first preselected pressure.

4. The apparatus as set forth in claim 2 wherein the first pressurizing means further includes a first movable barrier displacement sensing means for sensing displacement of the first movable barrier to (i) a maximum first separated gaseous component receiving region volume and (ii) a minimum first separated gaseous component receiving region volume, the first movable barrier sensing means (i) causing the pressurizing fluid supply means to supply pressurizing fluid to the first pressurizing fluid receiving region in response to sensing displacement of the first movable barrier to the maximum first preselected gaseous component receiving region volume and (ii) causing the pressurizing fluid supply means to vent the first pressurizing fluid receiving region in response to sensing the displacement of the first barrier to the minimum first separated gaseous component receiving region volume, whereby the first pressurizing means cycles at extremes of movement of the barrier.

5. apparatus as set forth in claim 4 wherein the barrier displacement sensing means includes a differential pressure sensing means for sensing a pressure difference between the first pressurizing fluid receiving region and the first preselected gaseous component receiving region, which pressure difference is indicative of the minimum first separated gaseous components receiving region volumes.

6. The apparatus as set forth in claim 5 wherein the barrier displacement sensing means further includes a pressure sensor for sensing pressure in the first separated gaseous component receiving region, the pressure sensor causing the pressurizing fluid supply means to supply pressurizing fluid to the first pressurizing fluid receiving region in response to the sensed pressure exceeding a preselected efficient operating pressure of the separator.

7. The apparatus as set forth in claim 2 wherein the second pressurizing means includes:
at least a second tank having a second movable barrier disposed in a sealing relationship between a second separated gaseous component receiving region and a second pressurizing fluid receiving region;
a second pressurizing fluid supply means for continuously supplying pressurizing fluid at the second preselected pressure to the second pressurizing fluid receiving region, whereby the selected gaseous component in the second selected gaseous component receiving region is continuously biased to the second preselected pressure.

8. The apparatus as set forth in claim 7 further including a compressor for compressing the gaseous mixture to at least the first preselected pressure, the compressor being operatively connected to the separating means for supplying the gaseous mixture thereto and with the first pressurizing fluid supply means and the second pressurizing fluid supply means, such that the compressed gaseous mixture is the pressurizing fluid.

9. The apparatus as set forth in claim 8 wherein the second pressurizing fluid supply means includes a differential pressure regulator means for reducing the pressure of the compressed gaseous mixture to a preselected pressure differential below the compressed gas mixture.

10. An apparatus for supplying oxygen at a relatively high pressure, the apparatus comprising:
an oxygen separator for separating oxygen from atmospheric air, the oxygen being produced at a relatively low pressure, the oxygen separator being operatively connected with an air compressor and accumulator, which accumulator stores compressed air;
a first reservoir having a first movable barrier therein for dividing the first reservoir into a first oxygen receiving region and a first pressurizing fluid receiving region, the first oxygen receiving region being operatively connected with the oxygen separator;
a cyclically operated valve for alternately (i) connecting the first pressurizing fluid receiving region with the accumulator and (ii) venting the first pressurizing fluid receiving region;
a second reservoir having a second movable barrier therein for dividing the second reservoir into a second oxygen receiving region and a second pressurizing fluid receiving region, the second oxygen receiving region being operatively connected by a check valve with the first oxygen receiving region, the second pressurizing fluid receiving region being operatively connected with the accumulator to supply a continuous compressed air biasing force to the second pressurizing fluid receiving region, the oxygen in the second oxygen receiving region being biased to the relatively high pressure which relatively high pressure is slightly less than the pressure of the oxygen in the first oxygen receiving region when the first pressurizing fluid receiving region is connected with the accumulator such that oxygen is cyclically transferred from the first oxygen receiving region to the second oxygen receiving region.

11. A method of supplying a selected gaseous component, the method comprising:
separating the selected gaseous component from a gaseous mixture, the separated gaseous component being at a relatively low separated gas pressure;
in a first tank cyclically (i) receiving the separated gaseous component at the relatively low separated gas pressure and (ii) increasing the pressure of the received separated gas with a first preselected pressure;
transferring the pressurized separated gaseous component to a second tank;
continuously pressurizing the gaseous component in the second tank to a second preselected pressure, which second preselected pressure is lower than the first pressure; and,
selectively supplying the gaseous component from the second tank at the second pressure.

12. The method as set forth in claim 11 wherein the cyclic receiving and pressure increasing step includes cyclically:
displacing a first movable barrier in the first tank with the received gaseous component until the received gaseous component reaches a preselected separator inefficiency pressure;and,
displacing the first barrier with a pressurizing fluid to pressurize the gaseous component with the first pressure and pump the gaseous component into the second tank until the first barrier reaches an extreme position.

13. The method as set forth in claim 12 further including monitoring a pressure differential across the first barrier to determine when the first barrier has reached the extreme positions such that when the gaseous component is not being discharged from the second tank, the second tank becomes pressurized to the first pressure and the gaseous component in the first tank is held at the first pressure such that no pressure differential is monitored across the first barrier and the cycling of the barrier displacement is stayed until the gaseous component is discharged from the second tank disrupting the pressure equilibrium across the first barrier.

14. The method as set forth in claim 12 wherein the continuously pressurizing step includes:
   receiving the gaseous component in the second tank on one side of a second barrier; and,
   continuously receiving a pressurizing fluid at the second preselected pressure on the other side of the second barrier.

15. The method as set forth in claim 14 further including the step of regulating the second pressure such that the second pressure differs from the first pressure by a preselected pressure differential.

* * * * *